(12) United States Patent
Kolbe et al.

(10) Patent No.: US 10,404,760 B2
(45) Date of Patent: Sep. 3, 2019

(54) PROVIDING NETWORK CONNECTIVITY TO AT LEAST ONE CLIENT DEVICE CONNECTED TO A TELECOMMUNICATIONS NETWORK VIA AN ACCESS GATEWAY DEVICE AND AN INTERNET PROTOCOL EDGE FUNCTION

(71) Applicant: Deutsche Telekom AG, Bonn (DE)

(72) Inventors: Hans-Joerg Kolbe, Darmstadt (DE); Thomas Haag, Rodgau (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/947,907

(22) Filed: Apr. 9, 2018

(65) Prior Publication Data

US 2018/0295156 A1 Oct. 11, 2018

(30) Foreign Application Priority Data

Apr. 10, 2017 (EP) ..................... 17165838

(51) Int. Cl.
*H04L 29/06* (2006.01)
*H04L 12/28* (2006.01)
*H04L 12/46* (2006.01)
*H04L 29/12* (2006.01)
*H04L 12/66* (2006.01)

(52) U.S. Cl.
CPC ........ *H04L 65/102* (2013.01); *H04L 12/2801* (2013.01); *H04L 12/4604* (2013.01); *H04L 12/4633* (2013.01); *H04L 61/2015* (2013.01); *H04L 12/66* (2013.01)

(58) Field of Classification Search
CPC ............... H04L 65/102; H04L 12/2801; H04L 12/4604; H04L 12/4633; H04L 61/2015; H04L 12/66
See application file for complete search history.

(56) References Cited

U.S. PATENT DOCUMENTS

| 7,715,310 | B1 * | 5/2010 | Sajassi ................ H04L 41/0659 370/219 |
| 2007/0130366 | A1 | 6/2007 | O'Connell et al. |
| 2009/0086744 | A1 * | 4/2009 | Huang ................... H04L 41/00 370/401 |
| 2013/0136117 | A1 | 5/2013 | Schrum, Jr. et al. |
| 2014/0286335 | A1 | 9/2014 | Wiget et al. |
| 2015/0207724 | A1 * | 7/2015 | Choudhury ............ H04L 41/12 370/255 |

* cited by examiner

*Primary Examiner* — Duc C Ho
(74) *Attorney, Agent, or Firm* — Leydig, Voit & Mayer, Ltd.

(57) ABSTRACT

A method for providing network connectivity to at least one client device includes: connecting the at least one client device to an access gateway device to create a local area network of the access gateway device; and connecting the access gateway device to an internet protocol edge function. The at least one client device is connected to a telecommunications network via the access gateway device and the internet protocol edge function. In order to provide the network connectivity to the at least one client device, a network connectivity link is provided, the network connectivity link comprising: a local area network-segment between the at least one client device and the access gateway device, and a wide area network-segment between the access gateway device and the internet protocol edge function.

13 Claims, 1 Drawing Sheet

PROVIDING NETWORK CONNECTIVITY TO AT LEAST ONE CLIENT DEVICE CONNECTED TO A TELECOMMUNICATIONS NETWORK VIA AN ACCESS GATEWAY DEVICE AND AN INTERNET PROTOCOL EDGE FUNCTION

CROSS-REFERENCE TO RELATED APPLICATIONS

Priority is claimed to European Patent Application No. EP 17 165 838.8, filed on Apr. 10, 2017, the entire disclosure of which is hereby incorporated by reference herein.

FIELD

The present invention relates to a method for providing network connectivity to at least one client device, the at least one client device being connected to a telecommunications network via an access gateway device and an internet protocol edge function, wherein in order to provide the network connectivity to the at least one client device, a network connectivity link is provided.

Furthermore, the present invention relates to an access gateway device for providing network connectivity to at least one client device, the at least one client device being connected to a telecommunications network via the access gateway device and an internet protocol edge function, wherein in order to provide the network connectivity to the at least one client device, a network connectivity link is realized.

Additionally, the present invention relates to an internet protocol edge function for providing network connectivity to at least one client device, the at least one client device being connected to a telecommunications network via an access gateway device and the internet protocol edge function, wherein in order to provide the network connectivity to the at least one client device, a network connectivity link is realized.

Still additionally, the present invention relates to a telecommunications network for providing network connectivity to at least one client device, the at least one client device being connected to the telecommunications network via an access gateway device and an internet protocol edge function, wherein in order to provide the network connectivity to the at least one client device, a network connectivity link is provided.

Furthermore, the present invention relates to a program and a computer program product comprising a computer readable program code which, when executed on a computer or on a access gateway device or on a broadband network gateway function or on a local area network extension instance, or in part on the access gateway function and/or in part on the broadband network gateway device and/or in part on the local area network extension instance, causes the computer or the access gateway device or the broadband network gateway function or the local area network extension instance to perform a method according to the present invention.

BACKGROUND

Conventionally, a customer local area network (LAN) is connected to a home gateway (HGW). The HGW terminates the local LAN segment and acts as a default gateway functionality to the wide area network (WAN). It usually also carries a network address translation (NAT) function and attaches to the internet protocol (IP) edge functionality which is usually the Broadband Network Gateway (BNG). This setup provides a clear separation between the local area network segment and the wide area network, wherein the demarcation point is inside the home gateway.

By using virtual home gateways/virtual customer premises equipment (vHGW/vCPE), functionality of a classical home router can be transferred into a WAN-based platform. Usually the implementations of such virtual home gateways are built upon a virtualization infrastructure. In such a scenario, functions such as dynamic host configuration protocol (DHCP), the default gateway functionality and the Network Address Translation reside in the virtual home gateway. Accordingly, architectures revealed in the state of the art are unsuitable for protecting the privacy of users and user equipment.

SUMMARY

In an exemplary embodiment, the present invention provides a method for providing network connectivity to at least one client device, the at least one client device being connected to a telecommunications network via an access gateway device and an internet protocol edge function. In order to provide the network connectivity to the at least one client device, a network connectivity link is provided, the network connectivity link comprising: a local area network-segment between the at least one client device and the access gateway device, and a wide area network-segment between the access gateway device and the internet protocol edge function. The access gateway device comprises a default gateway functionality related to a local area network, the local area network-segment being part of the local area network. The internet protocol edge function comprises at least one local area network extension instance. A further local area network-segment is provided between the local area network extension instance and the access gateway device, the further local area network-segment being likewise part of the local area network. The method comprises: connecting the at least one client device to the access gateway device to create the local area network of the access gateway device; and connecting the access gateway device to the internet protocol edge function.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
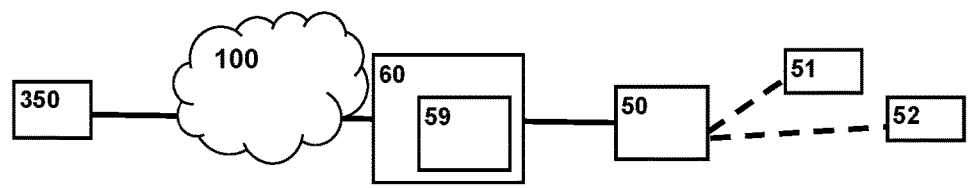
FIG. 1 schematically illustrates a system comprising a telecommunications network according to an embodiment of the present invention.

In an exemplary embodiment, the present invention provides a method for providing network connectivity to at least one client device, the at least one client device being connected to a telecommunications network via an access gateway device and an internet protocol edge function, with improved privacy for users and improved user experience.

In an exemplary embodiment, the present invention provides a method for providing network connectivity to at least one client device, the at least one client device being connected to a telecommunications network via an access gateway device and an internet protocol edge function, wherein in order to provide the network connectivity to the at least one client device, a network connectivity link is provided, the network connectivity link comprising:

a local area network-segment between the at least one client device and the access gateway device, and a wide area network-segment between the access gateway device and the internet protocol edge function, wherein the access gateway device comprises a default gateway functionality related to a local area network, the local area network-segment being part of the local area network, wherein the internet protocol edge device comprises at least one local area network extension instance, wherein a further local area network-segment is provided between the local area network extension instance and the access gateway device, the further local area network-segment being likewise part of the local area network, wherein the method comprises connecting the at least one client device to the access gateway device—thereby creating the local area network of the access gateway device—, and connecting the access gateway device to the internet protocol edge function.

According to the present invention, it is thereby advantageously possible that a local area network extension instance (and/or function) is comprised in a local area edge function (and/or device) or potentially associated to a local area edge function. It is thereby possible that the local area network extension instance serves as an end point for an (extended) local area network and especially that the local area network extension instance does not serve as a default gateway functionality for the local area network. It is thus possible that there is no automatic appearance within the local area network extension instance (or the address resolution protocol (ARP) cache in the local area network extension instance) of information regarding client devices, especially when a client device does not communicate with the local area network extension instance and, e.g., just joins the local area network. It is furthermore possible according to the present invention that the local area network extension instance is part of the local area network. It is advantageously possible that there are reduced technical requirements on the access gateway device (e.g. comprising at least some functionality of the home gateway functionality) and thus less cost. Furthermore, it is advantageously possible according to the present invention that layer 2 based services from the local area network can be moved to the wide area network (e.g., Universal Plug and Play media services that make use of layer 2 broadcast and multicast), which improves the user experience while a high level of privacy is maintained for the users.

It is thereby also advantageously possible according to the present invention that virtual devices (and/or services) reside in the local area network extension instance and are bound to an interface therein. It is possible that a virtual device/service (located in the local area network extension instance) is able to communicate with devices (e.g. client devices) in the local area network, especially via the further local area network-segment and, e.g., the local area network-segment. As an example, it is possible that always-on-services (devices) such as a machine-to-machine gateway, a telephony client and/or a media server etc. are located in the local area network extension instance. Thereby, it is advantageously possible that customers/users are not required to install physical (client) devices at home (within the local area network) themselves or running the services/devices on the access gateway device, which enhances the user experience and convenience, while guaranteeing high privacy for the users at the same time.

By contrast, in methods and systems disclosed in the state of the art that make use of virtual home gateways, the privacy of users is reduced. For example in systems known from the state of the art, as soon as a user device enters the local area network (e.g., when a user comes home and carries his smart phone), the operator of the telecommunications network is able to see that the user device (in this case the smart phone) entered the local area network and consequently knows that the user came home.

According to an embodiment of the present invention the method comprises a further step subsequent to the first step, wherein the further step comprises data transmission traffic within the local area network to be switched locally by the access gateway device, and data transmission traffic between the local area network and the telecommunications network to be routed via the access gateway device and the internet protocol edge function, wherein especially a wide area network tunnel is used on the wide area network-segment, wherein especially data transmission traffic to and from the local area network extension instance is routed via the access gateway device, wherein especially the access gateway device comprises a dynamic host configuration protocol server functionality related to the local area network.

Thereby, it is advantageously possible according to an embodiment of the present invention that data communication within a local area network is switched locally by the access gateway device, and also that data communication between the local area network (or components thereof (e.g., the client device) and the telecommunications network (the wide area network or components thereof) is routed via the access gateway device and the internet protocol edge function. It is also possible according to an embodiment of the present invention that a wide area network tunnel is used on the wide area network-segment. Furthermore, it is thereby possible that a dynamic host configuration protocol server functionality is comprised in the access gateway device especially in the local area network. Therefore, it is possible that the IP-MAC address mapping is done/located in the local area network and especially not in the local area network extension instance. It is also especially advantageously possible that a network address translation is created in the access gateway device, wherein the default gateway functionality is part of the access gateway device.

According to an embodiment of the present invention the access gateway device comprises an extension function and wherein the local area network extension instance is connected to the access gateway device, via the further local area network-segment and the extension function, especially over the wide area network or over the access network, wherein especially the local area network extension instance or virtual devices inside it can only access the telecommunications network and/or be accesses by the telecommunications network by traversing the access gateway device.

It is thereby advantageously possible according to an embodiment of the present invention that the local area network extension instance or virtual devices inside the local area network extension instance are only able to access the telecommunications network by traversing the access gateway device, and especially via the further local area network-segment and the wide area network-segment. Thereby, it is advantageously possible that the access gateway device or security functions and/or control mechanisms within the access gateway device or accessible to the access gateway device are able to control or are configured to control (especially all) data, information and/or traffic that is transmitted and/or received by the local area network extension instance, which is highly beneficial for the security and/or data protection and/or anonymity of users and client devices in the local area network. It is thereby also advantageously possible that Layer 2 services are hosted in the telecommunications network (by the operator) while the full control over (client) devices and the visibility of said devices (and thus the privacy) remains in the hands of the customer. It is especially possible that the local area network extension instance is completely managed via a remote access connection (via the further local area network-segment) by the customer/user. Thus, it is possible according to an embodiment of the present invention that only the customer/user has access to the local area network extension instance, while the operator of the telecommunications network does not (especially because traffic from and to the local area network extension instance, in particular all traffic, passes through the access gateway device and the further local area network-segment). However, it is also possible that the operator of the telecommunications network offers a service to manage local area network extension instance (or virtual devices therein), possibly as an on-demand service, which can be enabled if the customer/user chooses to.

According to an embodiment of the present invention, the local area network extension instance or virtual devices inside it is/are a member of the local area network of the access gateway device, connected to the access gateway device via a tunneled local area network bridge on the further local area network-segment,
wherein especially an address mapping between, on the one hand, internet protocol addresses of devices within the local area network, and, on the other hand, medium access control address of devices within the local area network is performed by a dynamic host configuration protocol server functionality comprised in the access gateway device, wherein especially Ethernet data packet frames are carried by the local area network bridge on the further local area network-segment,
wherein especially the local area network extension instance is directly connected to a local switch inside of the access gateway device, and
wherein especially any logical network interface of the local area network extension instance receives an internet protocol address upon a dynamic host configuration protocol request from the access gateway device, wherein such internet protocol addresses are especially either internet protocol version 4-internet protocol addresses or internet protocol version 6-internet protocol addresses, especially using stateless address autoconfiguration.

According to an embodiment of the present invention, the local area network extension instance comprises an address resolution protocol cache functionality related to the local area network, wherein especially the address resolution protocol cache functionality of the local area network extension instance exclusively comprises information related to or includes devices within the local area network—especially client devices—that actively communicate with the local area network extension instance or virtual devices therein.

It is thereby advantageously possible according to an embodiment of the present invention that an address resolution protocol (ARP) cache in the local area network extension instance only includes information on a client device (e.g. information on the media access control (MAC) address of the client device) if the client device actively communicates with the local area network extension instance. Thereby, it is possible that there is no automatic appearance of information regarding client devices that are connected to the local area network or part of the local area network within the local area network extension instance (or the address resolution protocol (ARP) cache in the local area network extension instance), e.g., of a client device that just joins the local area network.

According to an embodiment of the present invention, the local area network extension instance is realized by a virtual machine instance or a container instance, especially a linux or docker container instance, within the internet protocol edge function or connected to the internet protocol edge function.

According to an embodiment of the present invention, the local area network extension instance realizes or comprises service functions, especially always-on service functions and/or especially layer 2 services, being controlled by the access gateway device.

According to an embodiment of the present invention, the further local area network-segment is comprised in the wide area network-segment or is identical to the wide area network-segment or corresponds to a session or tunnel that is different from the wide area network-segment, wherein especially the local area network extension instance or virtual devices therein is/are managed and/or configured via the access gateway device, especially via the extension function, and the further local area network-segment and/or via an entity being part of the local area network, wherein especially specific virtual devices of the virtual devices comprised in the local area network extension instance are selectable via the access gateway device, especially via the extension function, and/or the local area network-segment and/or the further local area network-segment and/or the client device.

It is thereby possible according to an embodiment of the present invention that the further local area network-segment and the wide area network-segment are routed via the same connection (for example by a point-to-point protocol over Ethernet next to a plain Ethernet for a virtual local area network).

In an exemplary embodiment, the present invention provides an access gateway device for providing network connectivity to at least one client device, the at least one client device being connected to a telecommunications network via the access gateway device and an internet protocol edge function,
wherein in order to provide the network connectivity to the at least one client device, a network connectivity link is realized between the at least one client device and the telecommunications network, using the access gateway device, the network connectivity link comprising:
    a local area network-segment linking the access gateway device to at least one client device, and
    a wide area network-segment linking the access gateway device to the internet protocol edge function,
wherein the access gateway device comprises a default gateway functionality related to a local area network, the local area network-segment being part of the local area network, wherein the access gateway device is configured such that a further local area network-segment is provided between a local area network extension instance—being part of the internet protocol edge function—and the access gateway device, the further local area network-segment being likewise part of the local area network.

According to the present invention, it is thereby advantageously possible that a local area network extension instance (and/or function) is comprised in a local area edge function (and/or device). It is possible that the local area network extension instance serves as an end point for an (extended) local area network and especially that the local area network extension instance does not serve as a default gateway functionality for the local area network. It is thus possible that there is no automatic appearance within the local area network extension instance (or the address resolution protocol (ARP) cache in the local area network extension instance) of information regarding client devices, especially when a client device just joins the local area network. It is furthermore possible according to the present invention that the local area network extension instance is part of the local area network. It is advantageously possible that there are reduced technical requirements on the access gateway device (e.g. the home gateway functionality) and thus less cost. Furthermore, it is advantageously possible according to the present invention that layer 2 based services from the local area network can be moved to the wide area network (e.g., Universal Plug and Play media services that make use of layer 2 broadcast and multicast), which improves the user experience while a high level of privacy is maintained for the users.

According to an embodiment of the access gateway device according to the present invention, the access gateway device is configured such that
  data transmission traffic within the local area network are switched locally by the access gateway device, and
  data transmission traffic between the local area network and the telecommunications network are routed via the access gateway device and the internet protocol edge function, wherein especially a wide area network tunnel is used on the wide area network-segment.

According to an embodiment of the access gateway device according to the present invention, the access gateway device is a customer premises equipment device.

Furthermore, in an exemplary embodiment, the present invention provides an internet protocol edge function for providing network connectivity to at least one client device, the at least one client device being connected to a telecommunications network via an access gateway device and the internet protocol edge function,
wherein in order to provide the network connectivity to the at least one client device, a network connectivity link is realized between the at least one client device and the telecommunications network, using the internet protocol edge function, the network connectivity link comprising:
  a local area network-segment linking the access gateway device to at least one client device, and
  a wide area network-segment linking the access gateway device to the internet protocol edge function,
wherein the internet protocol edge function comprises or is connected to at least one local area network extension instance, wherein a further local area network-segment is provided between the local area network extension instance and the access gateway device, the further local area network-segment being part of a local area network having a default gateway functionality in the access gateway device and the local area network-segment being part of the local area network as well as the further local area network-segment.

Additionally, in an exemplary embodiment, the present invention provides a telecommunications network for providing network connectivity to at least one client device, the at least one client device being connected to the telecommunications network via an access gateway device and an internet protocol edge function,
wherein in order to provide the network connectivity to the at least one client device, a network connectivity link is provided, the network connectivity link comprising, especially as part of the telecommunications network:
  a local area network-segment between the at least one client device and the access gateway device, and
  a wide area network-segment between the access gateway device and the internet protocol edge function,
wherein the access gateway device comprises a default gateway functionality related to a local area network, the local area network-segment being part of the local area network, wherein the internet protocol edge function comprises or is connected to at least one local area network extension instance, wherein a further local area network-segment is provided between the local area network extension instance and the access gateway device, the further local area network-segment being likewise part of the local area network.

Still additionally, in an exemplary embodiment, the present invention provides a program comprising a computer readable program code which, when executed on a computer or on a access gateway device or on a broadband network gateway function or on a local area network extension instance, or in part on the access gateway function and/or in part on the broadband network gateway device and/or in part on the local area network extension instance, causes the computer or the access gateway device or the broadband network gateway function or the local area network extension instance to perform a method according to the present invention.

Furthermore, in an exemplary embodiment, the present invention provides a computer program product for providing network connectivity to at least one client device, the at least one client device being connected to a telecommunications network via an access gateway device and an internet protocol edge function, the computer program product comprising a computer program stored on a storage medium, the computer program comprising program code which, when executed on a computer or on a access gateway device or on a broadband network gateway function or on a local area network extension instance, or in part on the access gateway function and/or in part on the broadband network gateway device and/or in part on the local area network extension instance, causes the computer or the access gateway device or the broadband network gateway function or the local area network extension instance to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a system comprising a telecommunications network 100 according to an embodiment of the present invention is schematically illustrated. Two client devices 51, 52 (or any further number of client devices 51, 52 or only one client device 51) are comprised in a local area network 10 and are connected to the telecommunications network 100 via an access gateway device 50 and an internet protocol edge function 60 (e.g. an internet protocol edge device). Thus, a network connectivity link is provided for the client device 51 (and potentially also the client device 52). The telecommunications network 100 especially comprises or is connected to a specific server 350, which a client device 51, 52 communicates with or retrieves a service from.

Figure 2:
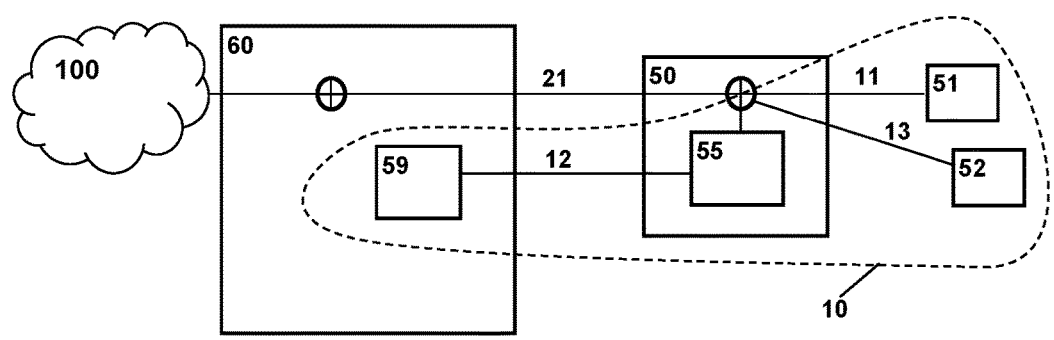
FIG. 2 schematically illustrates a system comprising a telecommunications network according to an embodiment of the present invention.

In FIG. 2, a telecommunications network 100 for providing network connectivity to at least one client device 51 according to an embodiment of the present invention is schematically illustrated. Two client devices 51, 52 (or any further number of client devices 51, 52 or only one client device 51) are connected to the telecommunications network 100 via an access gateway device 50 and an internet protocol edge function 60 (e.g. an internet protocol edge device).

A network connectivity link is provided for the client device 51 (and potentially also the client device 52). The network connectivity link comprises (or consists of) a local area network-segment 11 between the client device 51 and the access gateway device 50 and a wide area network-segment 21 between the access gateway device 50 and the internet protocol edge function 60. The local area network-segment 11 is part of the local area network 10. Via the local area network-segment 11 and the wide area network-segment 21, the client device 51 is provided network connectivity to the telecommunications network 100. Similarly, it is possible that a second further local area network-segment 13 exists between the client device 52 and the access gateway device 50 and that the client device 52 has access to the telecommunications network via the second further local area network-segment 13 and the wide area network-segment 21. The access gateway device 50 comprises a default gateway functionality and in some embodiments a dynamic host configuration protocol server functionality (however, it is also possible according to an embodiment of the present invention that the access gateway device 50 does not comprise a dynamic host configuration protocol server functionality) related to a local area network 10, such that it is possible that—for example in the case of an internet protocol version 6 (IPv6) deployment—a stateless address autoconfiguration and/or a dynamic host configuration protocol version 6 (DHCPv6) are used in different embodiments of the present invention. Furthermore, the internet protocol edge function 60 comprises a local area network extension instance 59. Between the local area network extension instance 59 and the access gateway device 50, a further local area network-segment 12 is established (and/or is provided). According to the present invention, the further local area network-segment 12 is also part of the local area network 10. Preferably, the access gateway device 50 comprises an extension function 55. According to an embodiment of the present invention, the local area network extension instance 59 is connected to the access gateway device 50 via the further local area network-segment 12 as well as the extension function 55. The local extension instance 59 does not comprise or act as a default gateway function to the wide area network/telecommunications network 100 for the local area network 10. Especially, any logical network interface or virtual device inside the local area network extension instance 59 receives an internet protocol address upon DHCP request from the access gateway device 50. Preferably, the local area network extension instance 59 or virtual devices/services inside it are only able to exchange data with the telecommunications network 100 (or entities thereof) by traversing the access gateway device 50, which is in control or controlled/managed by entities of the local area network 10 (or by a user/customer that has access to the local area network 10). However, it is also possible that the operator of the telecommunications network 100 offers a service to manage the local area network extension instance 59 or virtual devices/services inside it, and that the customer agrees that the operator therefore has access to the local area network extension instance 59.

It is also possible in an embodiment of the present invention that the local area network extension instance 59 has an internet protocol address and a way to access the wide area network/telecommunications network 100 directly, e.g. for the (sole) purpose of being remotely accessible from mobile clients. In this case, it is possible to remove the problem of having to bind remote access to smart homes to globally routed internet protocol addresses.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing network connectivity to at least one client device, the at least one client device being connected to a telecommunications network via an access gateway device and an internet protocol edge function,
wherein in order to provide the network connectivity to the at least one client device, a network connectivity link is provided, the network connectivity link comprising:
a local area network-segment between the at least one client device and the access gateway device, and
a wide area network-segment between the access gateway device and the internet protocol edge function,
wherein the access gateway device comprises a default gateway functionality related to a local area network, the local area network-segment being part of the local area network, wherein the internet protocol edge function comprises at least one local area network extension instance, wherein a further local area network-segment is provided between the local area network extension instance and the access gateway device, the further local area network-segment being likewise part of the local area network,
wherein the method comprises:
connecting the at least one client device to the access gateway device to create the local area network of the access gateway device; and
connecting the access gateway device to the internet protocol edge function.

2. The method according to claim 1, wherein the method further comprises:
switching, by the access gateway device, data transmission traffic locally within the local area network; and
routing, via the access gateway device and the internet protocol edge function, data transmission traffic between the local area network and the telecommunications network;
wherein a wide area network tunnel is used on the wide area network-segment;
wherein data transmission traffic to and from the local area network extension instance is routed via the access gateway device;
wherein the access gateway device comprises a dynamic host configuration protocol server functionality related to the local area network.

3. The method according to claim 1, wherein the access gateway device comprises an extension function and wherein the local area network extension instance is connected to the access gateway device, via the further local area network-segment and the extension function over the wide area network or over the access network, wherein the local area network extension instance or virtual devices inside it can only access the telecommunications network and/or be accessed by the telecommunications network by traversing the access gateway device.

4. The method according to claim 1, wherein the local area network extension instance or virtual devices inside it is/are a member of the local area network of the access gateway device, connected to the access gateway device via a tunneled local area network bridge on the further local area network-segment;
wherein an address mapping between, on the one hand, internet protocol addresses of devices within the local area network, and, on the other hand, medium access control addresses of devices within the local area network is performed by a dynamic host configuration protocol server functionality comprised in the access gateway device;
wherein Ethernet data packet frames are carried by the local area network bridge on the further local area network-segment;
wherein the local area network extension instance is directly connected to a local switch inside of the access gateway device; and
wherein any logical network interface of the local area network extension instance receives an internet protocol address upon a dynamic host configuration protocol request from the access gateway device, wherein such internet protocol addresses are either internet protocol version 4-internet protocol addresses or internet protocol version 6-internet protocol addresses using stateless address autoconfiguration.

5. The method according to claim 1, wherein the local area network extension instance comprises an address resolution protocol cache functionality related to the local area network, wherein the address resolution protocol cache functionality of the local area network extension instance exclusively comprises information related to or includes devices within the local area network that actively communicate with the local area network extension instance or virtual devices therein.

6. The method according to claim 1, wherein the local area network extension instance is realized by a virtual machine instance or a container instance within the internet protocol edge function or connected to the internet protocol edge function, wherein the virtual machine instance or the container instance is a linux or docker container instance.

7. The method according to claim 1, wherein the local area network extension instance realizes or comprises always-on service functions and/or layer 2 services being controlled by the access gateway device.

8. The method according to claim 1, wherein the further local area network-segment is comprised in the wide area network-segment or is identical to the wide area network-segment or corresponds to a session or tunnel that is different from the wide area network-segment, wherein the local area network extension instance or virtual devices therein is/are managed and/or configured via the access gateway device, via the extension function, and the further local area network-segment and/or via an entity being part of the local area network, wherein specific virtual devices of the virtual devices comprised in the local area network extension instance are selectable via the access gateway device, via the extension function, and/or the local area network-segment and/or the further local area network-segment and/or the client device.

9. A system for providing network connectivity to at least one client device, comprising:
an access gateway device; and
an internet protocol edge function;
wherein the at least one client device is connected to a telecommunications network via the access gateway device and the internet protocol edge function;
wherein in order to provide the network connectivity to the at least one client device, a network connectivity link is realized between the at least one client device and the telecommunications network, the network connectivity link comprising:
a local area network-segment linking the access gateway device to at least one client device, and
a wide area network-segment linking the access gateway device to the internet protocol edge function;

wherein the access gateway device comprises a default gateway functionality related to a local area network, the local area network-segment being part of the local area network;

wherein a further local area network-segment is provided between a local area network extension instance—being part of the internet protocol edge function—and the access gateway device, the further local area network-segment being likewise part of the local area network.

10. The system according to claim 9, wherein the access gateway device is configured to switch data transmission traffic locally within the local area network; and wherein the access gateway device and the internet protocol edge function are configured to route data transmission traffic between the local area network and the telecommunications network, wherein a wide area network tunnel is used on the wide area network-segment.

11. The system according to claim 9, wherein the access gateway device is a customer premises equipment device.

12. The system according to claim 9, wherein the internet protocol edge function comprises or is connected to at least one local area network extension instance.

13. A non-transitory, computer-readable medium having processor-executable instructions stored thereon for providing network connectivity to at least one client device, the at least one client device being connected to a telecommunications network via an access gateway device and an internet protocol edge function, wherein in order to provide the network connectivity to the at least one client device, a network connectivity link is provided, the network connectivity link comprising:

a local area network-segment between the at least one client device and the access gateway device, and a wide area network-segment between the access gateway device and the internet protocol edge function, wherein the access gateway device comprises a default gateway functionality related to a local area network, the local area network-segment being part of the local area network, wherein the internet protocol edge function comprises at least one local area network extension instance, wherein a further local area network-segment is provided between the local area network extension instance and the access gateway device, the further local area network-segment being likewise part of the local area network, wherein the processor-executable instructions, when executed, facilitate performance of the following:

connecting the at least one client device to the access gateway device to create the local area network of the access gateway device; and connecting the access gateway device to the internet protocol edge function.

* * * * *